United States Patent [19]
Goda et al.

[11] Patent Number: 5,744,256
[45] Date of Patent: Apr. 28, 1998

[54] MAGNETIC RECORDING MEDIUM AND METHOD OF PRODUCING SAME

[75] Inventors: Noriyoshi Goda; Shinya Matsuoka; Tatsuo Kawaide, all of Odawara; Takaaki Shirakura, Chigasaki, all of Japan

[73] Assignee: Hitachi, Ltd., Tokyo, Japan

[21] Appl. No.: 945,527

[22] Filed: Sep. 16, 1992

[30] Foreign Application Priority Data

Sep. 17, 1991 [JP] Japan .................................. 3-262556

[51] Int. Cl.$^6$ ...................................................... G11B 5/66
[52] U.S. Cl. .............................. 428/694 T; 428/834 TS; 428/694 TN; 428/665; 428/666; 428/667; 428/678; 428/900
[58] Field of Search ........................ 428/694 T, 694 TS, 428/694 TM, 665, 666, 667, 678, 900

[56] References Cited

U.S. PATENT DOCUMENTS

| | | | |
|---|---|---|---|
| 4,550,062 | 10/1985 | Takayama | 428/611 |
| 5,006,388 | 4/1991 | Kuzuo | 428/65.7 |
| 5,023,148 | 6/1991 | Fisher | 428/694 TS |
| 5,024,903 | 6/1991 | Mizukami | 428/694 TS |

*Primary Examiner*—Leszek Kiliman
*Attorney, Agent, or Firm*—Matthew G. Reeves

[57] ABSTRACT

The present invention relates to a high-density magnetic recording medium (or "media" as it is sometimes called) for a recording/reproduction system (such as thosed used in computer disk drives) and, more particularly, to a magnetic recording medium having a plurality of magnetic recording layers such that the uppermost layer is comparatively thinner and more densely structured than the lower magnetic recording layers. The present magnetic recording medium comprises a non-magnetic plated substrate, a non-magnetic underlying layer laminated on the plated substrate, a plurality of magnetic alloy layers including the uppermost layer laminated onto the underlying layer, a non-magnetic covering layer laminated onto the uppermost layer, and a lubricating layer formed onto the non-magnetic covering layer. The present invention improves the corrosion resistance of an alloy-type magnetic recording medium while maintaining or exceeding the recording/reproducing characteristics of such media, all at a desirable cost of production.

14 Claims, 8 Drawing Sheets

MAGNETIC RECORDING MEDIUM AND METHOD OF PRODUCING SAME

BACKGROUND OF THE INVENTION

The present invention relates to a magnetic recording and/or reproducing media (hereinafter referred to simply as "magnetic recording media" or "magnetic recording medium" as it is also known in the art), a method of producing such a media, and systems which incorporate such a media. More specifically, the aforestated media of the present invention is adapted to high-density recording, and demonstrates excellent reliability as shown by its resistance against corrosion. Such media may be used in computer disk drives, tape drives of all types, and any recording apparatus where magnetic recording is used.

Magnetic media for high-density recording applications have heretofore been known to produce high coercive forces which in turn provide high recording density. As examples, those using CoCrPt and CoCrPtTa magnetic films have been disclosed in Japanese patent Laid-Open No. 88806/1984 while those using a CoNiCrTa magnetic film have been disclosed in Japanese Patent Laid-Open No. 237925/1989. However, IEEE Trans. Mag., MAG-24, No. 6, p. 301 (1988), teaches that in order to obtain a high coercive force by using the CoCrPt and CoCrPtTa magnetic films, it is necessary to isolate a cobalt-rich layer from a chromium-rich layer in the film. IEEE Trans. Mag., MAG-26, No. 5, pp. 2700–05 (1990) has disclosed a Co-type alloy magnetic recording medium which is obtained by laminating a plurality of magnetic film layers and interposing non-magnetic film layers to reduce medium noise. However, the method disclosed in IEEE Trans. Mag., MAG-26, No. 5, p. 2706 (1990) of interposing non-magnetic films among the plurality of magnetic films indicates that while the medium noise can be decreased, it is at the same time difficult to produce a medium having increased resistance against corrosion.

When the magnetic recording medium is placed in a corrosive environment, a cobalt-rich layer becomes substantially corroded. For that reason, it becomes difficult to maintain the reliability of the magnetic recording medium. In order to maintain reliable corrosion resistance, Japanese patent Laid-Open No. 195718/1987 has proposed the use of a CoNi-based alloy as a magnetic film to which third and fourth elements are added. When the corrosion resistance is improved by the addition of the third elements by using a CoNi base, a corrosion-resistant magnetic film is produced with less difficulty than when the magnetic recording medium uses a CoCr-based alloy such as is disclosed in IEEE Trans. Mag., MAG-26, No 5, pp. 2715–17 (1990). However, when the CoNi base is chosen, the medium noise becomes too large either to obtain a high output medium noise ratio (S/N) or to accomplish a high-density recording.

Finally, Japanese patent Laid-Open No. 184720/1989 describes a magnetic recording medium which prevents corrosion in the magnetic layer by inserting a non-magnetic layer between a magnetic layer and a non-magnetic covering layer. Unfortunately, by inserting a thin film, reliability of corrosion resistance is lost. Furthermore, in order to prevent corrosion of the magnetic film by inserting a non-magnetic film between the magnetic film and the non-magnetic film, increased amounts of space must be allocated both for the head and for the medium in the instance of magnetic recording.

As a result of the increased space allocation, the effectiveness of recording/reproducing operations such as output, overwrite, etc. is drastically deteriorated despite the use of a CoCr-based alloy. It therefore becomes necessary to choose between decreasing the thickness (t) of the non-magnetic covering layer and of the lubricating film, decreasing the thickness (t) of the inserted or interposed film, or decreasing the floating height of the magnetic recording head. The consequences of decreasing the above variables include potential losses relating: (1) to the effectiveness of the non-magnetic covering layer and the lubricating film; (2) slide resistance; or (3) corrosion resistance reliability.

Particularly with respect to the choice of decreasing the floating height of the magnetic recording head, the probability of contact increases between the magnetic recording head and the magnetic recording media; therefore, reliability of slide resistance is impaired.

Admittedly, the decrease in the thickness (t) of GAMMA-$Fe_2O_3$ film medium would not substantially detract from the otherwise excellent corrosion resistance properties of the medium. However, GAMMA-$Fe_2O_3$ is considerably less effective than thin metal film in maintaining either a reliable slide resistance or the large coercive force and residual magnetization necessary for high-density recording. A need has therefore been felt to provide a thin metal film magnetic recording medium having excellent resistance against corrosion yet maintaining excellent magnetic properties of the thin magnetic metal film.

SUMMARY OF THE INVENTION

The present invention is intended to solve the aforesaid need. A first object of the present invention is to provide a magnetic recording medium having a reliably high standard of resistance against corrosion yet maintaining excellent magnetic properties, including but not limited to recording and/or reproducing operations. A second object of the present invention is to provide a method of producing the magnetic recording medium. A third object of the present invention is to provide a system which incorporates the thin metal film magnetic recording medium.

The above first object is achieved by a magnetic recording medium comprising a substrate, an underlying layer provided on the substrate, and a magnetic recording layer provided on the underlying layer; wherein the magnetic recording layer further comprises a plurality of alloy layers. Among the plurality of alloy layers, the average particle size of columnar crystals in the surface of the uppermost magnetic recording layer of the magnetic recording layers is smaller than that in the surfaces of the magnetic recording layer excluding said uppermost magnetic recording layer (hereinafter referred to simply as "lower magnetic recording layer"). To the extent necessary, a non-magnetic covering layer shall be provided on the magnetic recording layer, and a lubricating film layer shall be formed in or on this non-magnetic covering layer.

Having smaller particle diameters, the uppermost magnetic recording layer becomes more dense and tightly configured than the lower magnetic recording layers having larger particle diameters. By virtue of its increased density and configuration, the uppermost magnetic recording layer effectively works as a protection film, resisting against external corrosion, as the reduced size and number of gaps among the columnar crystals substantially prevent the infiltration of corrosive substances such as chloric and sulfuric gases. Moreover, the smaller columnar crystal particles of the uppermost magnetic recording layer form a comparatively fine barrier which effectively reduces the media noise; therefore providing an additional, valuable, result through the use of the present invention.

In the above magnetic recording media, the magnetic recording layer comprises two or more alloy layers, the uppermost magnetic recording layer of the magnetic recording layers may also be thinner than the lower magnetic recording layers.

In order to obtain a high coercive force and high residual magnetization such as are vital in recording and/or reproducing operations, the uppermost layer of the magnetic recording layers shall substantially comprise a CoNi-based alloy for magnetic recording. Such CoNi-based alloy shall be comprised of 1 to 40 atomic % Ni and 1 to 20 atomic % other metal or like substance (hereinafter referred to simply as "other metal"). Furthermore, such other metal shall be comprised of at least one element selected from such transition metals as Ti, V, Cr, Zr, Nb, Mo, Hf, Ta, W, Ir and Pt, wherein the remainder of such other metal is Co. The advantages of such composition include an increase in the corrosion resistance on the surface of the magnetic recording layer, as well as both a high coercive force and high residual magnetization to the magnetic medium, thereby increasing the effectiveness of the medium for high-density recording.

Excluding its uppermost layer, the above-mentioned magnetic recording layer comprising the plurality of individual magnetic recording layers shall be comprised of a CoCr-based alloy for magnetic recording. Furthermore, such CoCr-based alloy shall be comprised of 1 to 30 atomic % Cr and 1 to 20 atomic % other metal. Accordingly, such other metal shall be comprised of at least one element selected from such transition metals as Ti, V, Zr, Nb, Mo, Hf, Ta, W, Ir and Pt (but not including Cr) and from Ge and Si, wherein the remainder of such other metal is Co. The advantages of such composition include a decrease in the medium noise with no significant loss of corrosion resistance, as well as adaptability to high-density magnetic recording and enhanced reliability in corrosion resistance.

Alternatively, excluding its uppermost layer, the individual magnetic recording layer comprising the magnetic recording layers shall be comprised of a Co-based alloy for magnetic recording. Furthermore, such aforementioned Co-based alloy shall be comprised of 1 to 45 atomic % metal including at least one element selected from such transition metals as Ti, V, Zr, Nb, Mo, Hf, Ta, W, Ir and Pt and from P and Si.

Intermediate layers such as non-magnetic recording layers may be interposed among the plurality of magnetic recording layers, such that the uppermost layer acts as a corrosion resistant magnetic metal film. Such intermediate layers both decrease the medium noise and maintain reliability in corrosion resistance by substantially incorporating the properties of the magnetic recording layer.

The oxygen concentration in the Co-based alloy shall preferably be less than 10 atomic % in the magnetic recording layers. In particular, the oxygen content in the uppermost magnetic recording layer shall be greater than the oxygen content in the lower magnetic recording layers, and the particle size in the uppermost magnetic recording layer may be set to be smaller than the particle size in the lower magnetic recording layers. The primary advantages of such concentration in the Co-based alloy include an increase in the coercive force, which in turn makes it possible to produce a magnetic recording medium which is adapted to high-density recording and features reliability in corrosion resistance.

The second object of the present invention is achieved by a method of producing the media. In general, the layers of thin films are laminated or deposited upon a substrate by sputtering or other effective technique. The method more specifically comprises the steps of: laminating an underlying layer onto a substrate; laminating a magnetic recording layer on the underlying layer (wherein the magnetic recording layer is comprised of a plurality of alloy layers). The average particle size of columnar crystals in the surface of the uppermost magnetic recording layer of the magnetic recording layers is set to be smaller than that in the lower layers. Interposed intermediate such layers may be non-magnetic layers among the several magnetic recording layers. In such a case the uppermost layer of magnetic recording layers comprises a corrosion resistant magnetic metal film.

According to the method of the present invention, a non-magnetic covering layer is laminated onto the magnetic recording layer. Finally, a lubricating film layer is provided in, or on, this non-magnetic covering layer. Thus, the magnetic recording medium, while possessing high quality and stability, can be easily produced and at a reduced cost.

In order to set the particles of the uppermost layer to a smaller size than that of the lower layers, the uppermost layer shall be formed in a gaseous atmosphere of a pressure lower than that of a gaseous atmosphere in which the lower layers are formed. Furthermore, as the uppermost layer is formed, a target electric power shall be supplied to the uppermost layer which is greater than the target electric power with which the lower layers are formed. The increased energy in the uppermost layer enables a dense layer to be formed while not inheriting the diameters of columnar crystal particles provided in the lower magnetic films. In this fashion, the desired magnetic recording media shall be produced.

As a layer grows during the production of the medium, columnar crystal particles extend and enlarge in a funnel or fan shape toward the upper direction. Correspondingly, as each particle size increases, it loses density. However, when the uppermost layer is formed subsequent to the formation of the lower layer, the particle diameters can be adjusted independently from the diameters of the crystal particles in the lower layer. Consequently, the uppermost layer is enabled to form as dense columnar crystals having small particle diameters. Furthermore, growth of particle diameters can be suppressed when the thickness (t) of the uppermost layer is restrained.

Because the uppermost layer is thinner than the magnetic recording layer, the crystalline particles in the uppermost layer are unable to extend to as sizeable dimensions as are found in the surface of the magnetic recording layer. Furthermore, because columnar crystal particles from the lower magnetic recording layer are suppressed from growing into the layer, a dense arrangement of columnar crystals is allowed to form in the uppermost layer. Such a magnetic recording media configuration substantially enhances corrosion resistance and decreases media noise.

In the past, some difficulty existed with respect to both achieving structural stability and controlling production cost during the course of preparing a highly dense magnetic recording layer. Known configurations had sought to utilize finely-formed particles throughout the entire magnetic including the lower magnetic recording layers.

However, according to the present invention, small particle diameters must only be maintained in the formation of the uppermost layer. The uppermost layer preferably provides a protective film that effectively resists external corrosion. Consequently, the magnetic recording media according to the present invention has excellent recording and reliability characteristics obtained at a reduced manufacturing cost relative to previous media producing methods.

DETAILED DESCRIPTION OF THE PREFERRED EMBODIMENTS

Hereinafter, preferred embodiments of the present invention will be described with reference to the drawings.

Figure 1:
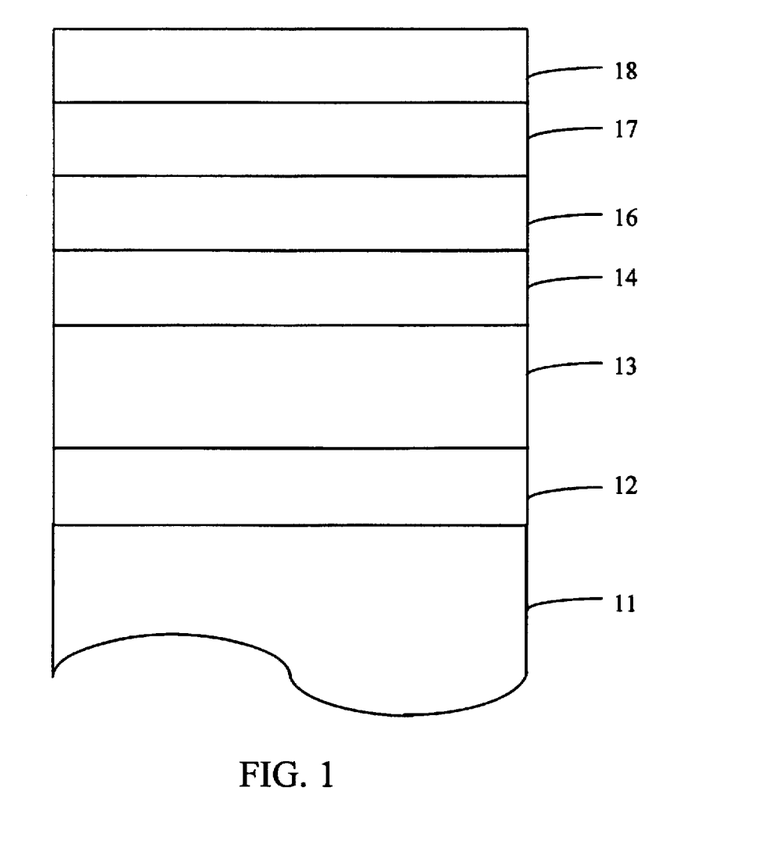
FIG. 1 is an illustrative view for explaining the sectional structure of a magnetic recording medium according to one embodiment of the present invention.

FIG. 1 illustrates a sectional view of a magnetic recording medium according to one embodiment of the present invention, wherein reference numeral 11 denotes a substrate composed of an Al alloy or a like material, 12 denotes a non-magnetic plated layer consisting of Ni—P, Ni—Cu—P or the like, 13 denotes an underlying layer composed of Cr or the like, 14 denotes a lower magnetic recording layer composed of a Co-based alloy, 16 denotes a corrosion-resistant magnetic recording layer (uppermost magnetic recording layer) composed of a Co-based alloy, 17 denotes a non-magnetic covering layer composed of C or the like, and reference numeral 18 denotes a lubricating film layer composed of perfluoroalkylpolyether or the like. Among them, the underlying layer 13, lower magnetic recording layer 14, uppermost magnetic recording layer 16 and non-magnetic covering layer 17 are all formed by sputtering or like technique, and the lubricating layer 18 is formed by a coating method or a like method. The paragraphs which follow shall provide additional detail with respect to both the preferred compositions of and preferred methods of producing a magnetic medium of the present invention.

Embodiment One

Denoted at 12 is a non-magnetic 11% wt P—Ni layer which was plated with a maintained thickness t of 20 MICROm onto a 1.3 mm-thick Al alloy substrate 11 having an outer diameter of 90 mm and an inner diameter of 25 mm, wherein additionally the surface of layer 12 was polished. For convenience, said alloy substrate 11 and said non-magnetic layer 12 shall be referred to as a plated substrate. Fine scars of a center-axis average coarseness Ra of 8 nm were formed in the surface of the substrate 11 in the circumferential direction thereby to form a non-magnetic plated layer 12 of said plated substrate having a thickness t of 13 MICROm. A Cr underlying layer 13 was then formed thereon maintaining a thickness t of 150 nm at a substrate temperature of 200° C. under an Ar pressure of 10 mTorr and with a DC electric power of 4 W/cm$^2$ on which was then formed a lower magnetic recording layer 14 of a CoNi$_{12}$Cr$_6$ alloy maintaining a thickness t of 30 nm under an Ar pressure of 10 mTorr and with a DC electric power of 4 W/cm$^2$. Then, an uppermost magnetic film layer 16 of a CoNi$_{12}$Cr$_6$ alloy was formed maintaining a thickness t of 30 nm under an Ar pressure of 10 mTorr with a DC electric power of 9 W/cm$^2$.

Figure 2:
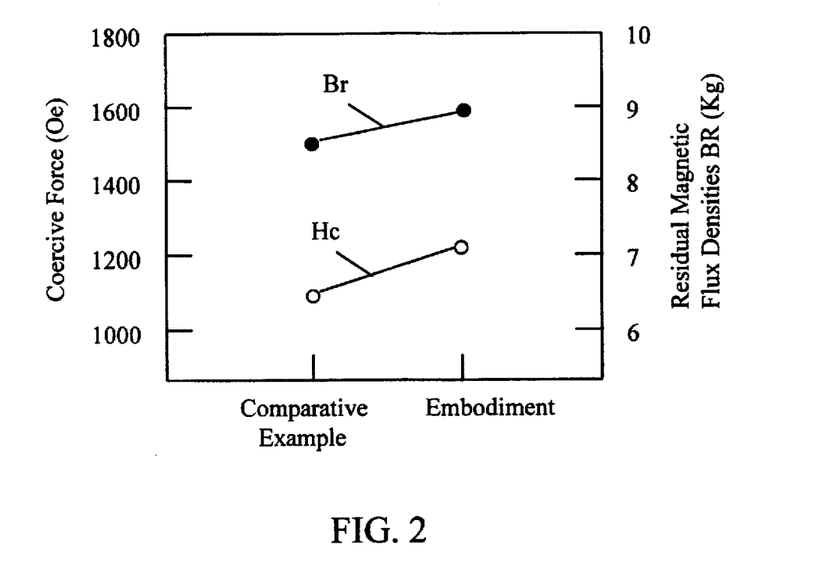
FIG. 2 is a characteristic graph for explaining the magnetostatic characteristics related to a magnetic recording medium of the embodiment of FIG. 1, specifically showing the comparison between the coercive force Hc of said embodiment and that of a known medium, additionally showing the comparison between the residual magnetic flux density Br of said embodiment and that of said known medium.

FIG. 2 shows the results of testing wherein a sample obtained by cutting a recording medium of the present invention prepared as described above into 7 mm×7 mm pieces was measured for its magnetostatic characteristics using a VSM (vibration sample magnetometer) in a saturation magnetic field of 5 kOe measured for 20 minutes/loop. The corresponding comparative example illustrates the results of testing wherein a known disk having uppermost and lower magnetic films formed under an Ar pressure of 10 mTorr with a laminating DC electric power of 4 W/cm$^2$ (uppermost and lower layers 30 nm in thickness t, respectively) was measured in the same manner as described above.

In FIG. 2, the plotted data appearing at the left side shows the comparative example and the plotted data appearing at the right side shows the embodiment of the present invention. This characteristic graph illustrates the impact upon magnetostatic characteristics when the uppermost magnetic recording layer 16 is formed with an increased DC electric power. Both the coercive force and the magnetic flux density increase proportionally with increases in DC electric power.

Observations were made of cross sections of the disk using a high-resolution scanning electron microscope (SEM) at magnifications of 500,000 times and 1,000,000 times which indicated changes to columnar crystals in the vicinity of the central portion of the magnetic film in the aforementioned embodiment. Such observations revealed more dense crystal particles in the uppermost magnetic recording layer 16 than appeared in the comparative example.

Using a high-resolution SEM at magnifications of 500,000 times and 1,000,000 times, the aforementioned observations were verified experimentally. Comparative observations were made of the uppermost magnetic film surfaces of disks having lower and uppermost magnetic films, wherein one disk was formed under the conditions of the original observation (electric power of 4 W for both the uppermost and lower magnetic films), and the other disk was formed under different conditions (electric power of 4 W for the lower magnetic film and 9 W for the uppermost magnetic film). Such experiments revealed that the average crystalline particle diameters were about 60 nm for disks formed under the conditions of the original observation and about 40 nm for disks formed under said different conditions.

Additional comparative observations were made between the surface of a disk having only a lower magnetic film (having a thickness t of 30 nm with electric power of 4 W) and that of the disk formed under the aforestated different conditions (having a lower film 30 nm in thickness t with 4 W and the uppermost film 30 nm in thickness t with 9 W). The findings from such comparison revealed differences in the average crystalline particle sizes. The average crystalline particle size of the former disk was roughly 45 nm, whereas the corresponding particle size for the latter disk was roughly 40 nm.

The foregoing observations reveal a number of additional relationships pertinent to the above embodiment which shall follow. The particle diameter of the columnar crystals increases in the form of a fan or funnel as the thickness t of the magnetic recording layer 14, 16 increases upward (e.g., as the crystals grow). However, as the electric power supplied to the particles increases, the particle diameter decreases and the layer becomes highly dense. When the lower magnetic recording layer 14 and uppermost magnetic recording layer 16 are formed under the same conditions, the uppermost magnetic recording layer 16 is formed in a fan shape that is continuous with the lower magnetic recording layer 14 of the fan shape, and the uppermost magnetic recording layer 16 becomes more coarse than the lower magnetic recording layer 14 and has large particle diameters. On the other hand, when the magnetic recording layers are formed under different conditions, the uppermost magnetic recording layer 16 of the fan shape is formed independently of the lower layer of the fan shape but on the uppermost surface thereof. Therefore, in the instance of higher power supplied to the uppermost magnetic recording layer 16, the fan shape in said layer 16 is formed more densely than in the lower magnetic recording layer 14 and has small particle diameters.

Figure 3:
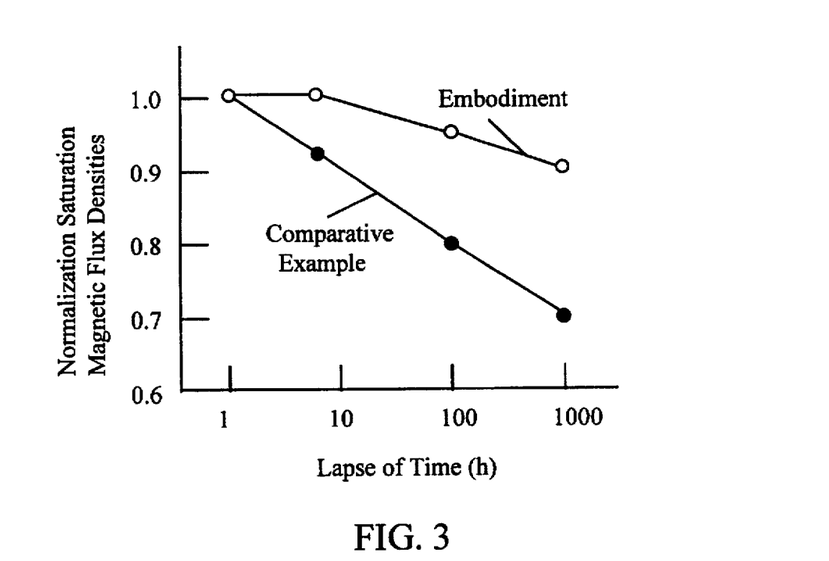
FIG. 3 is a characteristic graph for explaining the results of salt water spray testing of a magnetic recording medium of the embodiment of FIG. 1, therein comparing the relationship between the lapse of time and the normalization saturation magnetic flux density of said embodiment with that of said known medium.

FIG. 3 shows comparative changes in the normalization saturation magnetic flux densities of the magnetic recording medium of the embodiment which occur as the lapse of time increases during testing with salt water spray at 1N at 60° C. In the case of the magnetic recording medium of the embodiment of the present invention, the saturation magnetic flux density changes little with lapse of time. This slight change indicates good corrosion resistance. The same results are reached irrespective of the choice of magnetic film alloy, even when CoNi, CoCrTr and CoCrPt alloys are selected for salt water testing at the aforestated conditions.

It was found that these results are reached when the average particle diameter of crystalline particles in the surface of the uppermost magnetic recording layer 16 is smaller than the average particle diameter of crystalline particles in the lower magnetic recording layer 14.

Embodiment Two

In another embodiment of the present invention denoted in FIG. 1, a plated substrate is comprised of a non-magnetic 11 wt % B-Ni layer 12 plated with a maintained thickness t of 20 MICROm onto a 1.3 mm-thick Al alloy substrate 11 having an outer diameter of 90 mm and an inner diameter of 25 mm, whereupon additionally the surface of layer 12 was polished. Fine scars of a center-axis average coarseness Ra of 9 nm were formed in the surface of the substrate 11 in the circumferential direction thereby to form a non-magnetic plated layer 12 having a thickness t of 15 MICROm. A Cr underlying layer 13 was then formed thereon maintaining a thickness t of 150 nm at a substrate temperature of 180° C. under an Ar pressure of 10 mTorr and with a DC electric power of 7 W/cm$^2$ on which was then formed a lower magnetic recording layer 14 of CoNi$_{12}$Cr$_6$ under the same conditions as the Cr underlying layer.

An uppermost magnetic recording layer 16 was then formed thereon maintaining thicknesses t of 1, 5, 10 and 20 nm using a Co$_{75}$Ni$_{25}$ alloy target to which Zr was added in a content of 8 atomic % such that the saturation magnetic flux density was 10,000 gausses. Particularly, such value for the saturation magnetic flux density is necessary in order that it combine as an arithmetic product with whole thickness t of the uppermost magnetic recording layer 16 to equal the discrete value of 400 gausses.MICROm. In this case, the thickness t of the lower magnetic recording layer 14 is additionally determinative in satisfying the above gauss.MICROm requirement. Thereafter, a non-magnetic covering layer 17 of C was formed maintaining a thickness t of 30 nm under the conditions of 8 W/cm$^2$ and 3 mTorr. Corrosion strengths of the magnetic recording media of the present invention were tested by spraying 5N NaCl solution upon said media at the varying uppermost magnetic recording layer 16 thickness t indicated above. While the effect of saturation magnetic f*lux density was discernable even in cases where said thickness t was only 1 nm, such effect was particularly evident in cases where said thickness t exceeded 5 nm. There was no discernable change regarding said properties in the cases when said thickness t was greater than 20 nm.

Embodiment Three

In another embodiment of the present invention denoted in FIG. 1, the composition of the lower magnetic film layer 14 was changed for testing in the same manner as in the above embodiment. A plated substrate is comprised of a non-magnetic 11 wt % P—Ni layer 12 plated with a maintained thickness (t) of 20 MICROm onto a 1.3 mm-thick Al alloy substrate 11 having an outer diameter of 90 mm and an inner diameter of 25 mm, whereupon additionally the surface was polished. Fine scars of a center-axis average coarseness Ra of 9 nm were formed in the surface of the substrate 11 in the circumferential direction thereby to form a non-magnetic plated layer 12 having a thickness (t) of 15 MICROm.

A Cr underlying layer 13 was then formed upon said non-magnetic plated layer 12 maintaining a thickness t of 150 nm under the conditions of substrate temperature of 180° C., Ar pressure of 10 mTorr, and DC electric power of 7 W/cm$^2$. A lower magnetic recording layer 14 of CoCr$_{12}$Ta$_4$ was then formed upon said Cr underlying layer 13 under the same conditions as the Cr underlying layer 13. An uppermost magnetic recording layer 16 was then formed thereon maintaining thicknesses (t) of 1, 5, 10 and 20 nm using a $Co_{75}Ni_{25}$ alloy target to which Zr was added in a content of 8 atomic %. As described previously, the required saturation magnetic flux density was 10,000 gausses (such that 400 gausses.MICROm was maintained constant). A non-magnetic covering layer 17 of C was then formed maintaining a thickness (t) of 30 nm under the conditions of 3 mTorr and 8 W/cm². Finally, the magnetic recording medium was completed with the formation of a liquid lubricating layer 18 of perfluoroalkylpolyether maintaining a thickness (t) of 5 nm.

Figure 4:
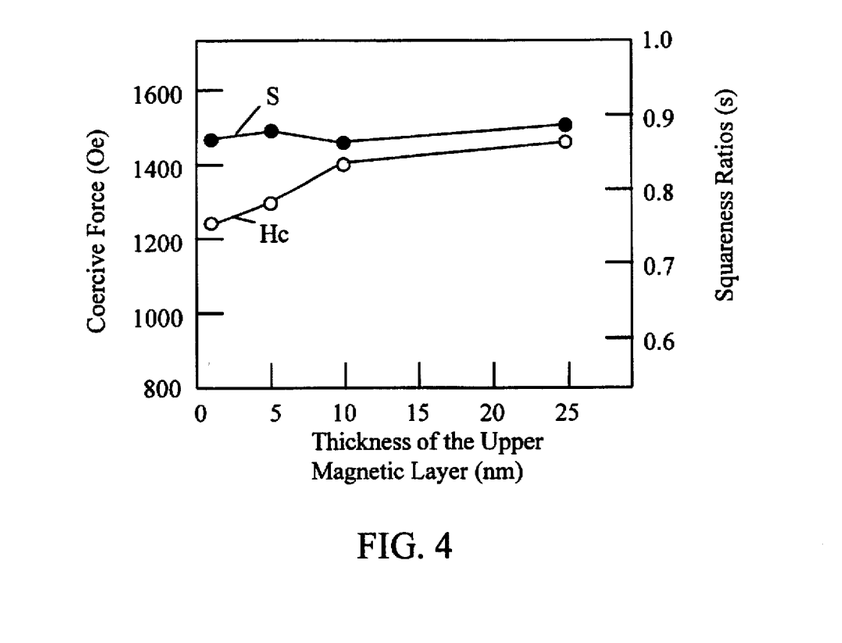
FIG. 4 is a characteristic graph for explaining the magnetostatic characteristics related to a magnetic recording medium according to another embodiment of the present invention, therein showing the impact of the thickness (t) of the uppermost magnetic recording layer upon both the coercive force Hc and the sequareness ratio of said embodiment.

FIG. 4 shows the coercive forces Hc of the magnetic recording media at the varying uppermost magnetic level 16 thicknesses (t), wherein all of the coercive forces Hc were greater than 1000 Oe. Correspondingly, each of the squareness ratios "S" at said varying uppermost magnetic level 16 thicknesses (t) was greater than 0.8. The factors which influenced the changes in coercive force Hc included the thickness (t) of the $CoCr_{12}Ta_4$ lower magnetic recording layer 14 and the thickness (t) of the $(Co_{75}Ni_{25})_{92}Zr_8$ uppermost magnetic recording layer 16. In particular, the coercive force Hc increased proportionally with decreases in the thickness (t) of the $CoCr_{12}Ta_4$ lower magnetic recording layer 14.

The recording/reproducing characteristics of these magnetic recording media were measured using a thin-film head having a gap length of 0.3 MICROm, a pole length of 5.5 MICROm, and a track width of 8 MICROm. The peripheral speed of the magnetic recording medium was 12.4 m/s, while the floating amount of head was measured at 0.15 MICROm.

Figure 5:
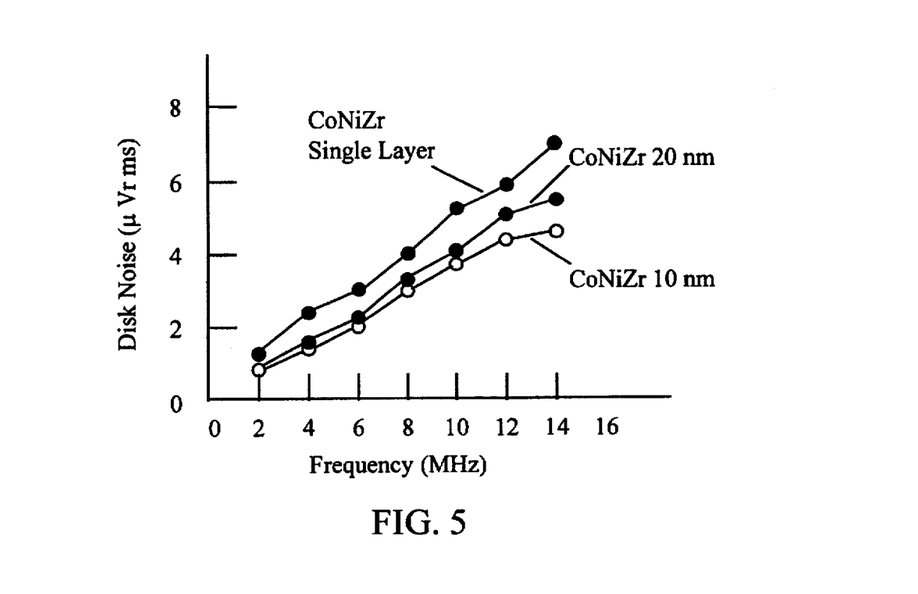
FIG. 5 is a characteristic graph for explaining the recording frequency characteristics of medium noise of the embodiment of FIG. 4, therein comparing the relationship between the frequency and the medium noise of a single magnetic layer film medium with that of alternate compositions.

FIG. 5 shows the comparative relationships between disk noise and changes in the recording frequency. Included in such comparison is the instance wherein the magnetic recording medium has a $(Co_{75}Ni_{25})_{92}Zr_8$ single magnetic layer film formed under the same conditions as those of forming a $CoCr_{12}Ta_4$ single magnetic layer film. The $(Co_{75}Ni_{25})_{92}Zr_8$ single magnetic layer film exhibits the greatest disk noise at every frequency, and the disk noise decreases with an increase in the thickness (t) of the lower $CoCr_{12}Ta_4$ magnetic recording layer 14. The combined (lower and uppermost magnetic recording layer 14, 16) disk noise is nearly the same as that of a $CoCr_{12}Ta_4$ single magnetic film layer when the thickness t of the $(Co_{75}Ni_{25})_{92}Zr_8$ film is smaller than 10 nm.

Similar results were obtained even when the uppermost magnetic recording layer 16 was formed maintaining thicknesses (t) of 1, 5, 10, 20, 30 and 40 nm on a $CoCr_{12}Pt_{10}$ lower magnetic recording layer 14. In this case, the whole thickness (t) of the magnetic film was 60 nm using a $Co_{65}Ni_{35}$ alloy target for said uppermost magnetic recording layer 16 to which Zr was added in a content of 6 atomic %. Good characteristics were exhibited when the thickness (t) was smaller than 30 nm (50% of the previous thickness (t). In particular, characteristics nearly the same as those of the $CoCr_{12}Pt_{10}$ single magnetic layer film were exhibited in the combined (uppermost and lower) layers 14, 16 when the thickness (t) of the uppermost magnetic recording layer 16 was smaller than 10 nm.

Corrosion strengths of these magnetic recording media were examined by spraying a 5N NaCl solution. While the effect of saturation magnetic flux density was discernable in the uppermost magnetic recording layer 16 even in cases where said thickness (t) was only 1 nm, such effect was particularly evident in cases where said thickness (t) exceeded 5 nm. There was no discernable change regarding said effect in the cases when said thickness (t) was greater than 20 nm.

Embodiment Four

In yet another embodiment of the present invention denoted in FIG. 1, a plated substrate is comprised of a non-magnetic 12 wt % P—Ni layer 12 plated maintaining a thickness (t) of 20 MICROm onto a 1.9 mm-thick Al alloy substrate 11 having an outer diameter of 130 mm and an inner diameter of 40 mm. Upon said P—Ni layer 12 was formed a thin Cr film 13 maintaining a thickness (t) of 300 nm under the conditions of substrate temperature 200° C., Ar pressure of 5 mTorr and DC electric power of 1 W/cm². Upon said Cr film 13 layer was formed a $Co_{80}Cr_{12}Ta_4$ lower magnetic recording layer 14 maintaining a thickness (t) of 50 nm under the same conditions as those of the thin Cr film 13. Upon said lower magnetic recording layer 14 was formed a corrosion-resistant uppermost magnetic recording layer 16 maintaining a thickness (t) of 10 nm by using a $Co_{70}Ni_{30}$ alloy target. To said alloy target were added Ti, Zr, V, Nb, Ta, Cr, Mo, W, Ru, Rh, Pd and Pt in contents of 0.05 atomic 0.1 atomic %, 1 atomic %, 10 atomic %, 15 atomic %, 20 atomic %, 30 atomic 40 atomic % and 50 atomic %.

Figure 6:
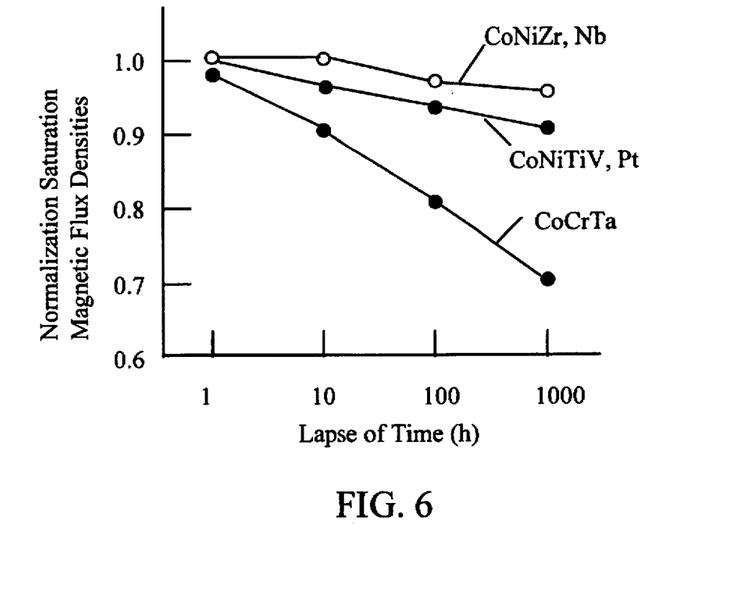
FIG. 6 is a characteristic graph for explaining the results of salt water spray testing of the embodiment of FIG. 4, therein comparing the relationship between the lapse of time and the normalization saturation magnetic flux density of a single magnetic layer film medium with that of alternate compositions.

FIG. 6 shows the relationship between the saturation magnetic flux density of a magnetic recording medium and the lapse of time as tested by spraying a 1N NaCl solution at 60° C. Relative to CoNi in the aforestated alloy target, the third element was added to the uppermost corrosion-resistant magnetic film 16 of the magnetic recording medium at a concentration of 10 atomic %. Formation of the corrosion-resistant uppermost magnetic film 16 to which Ti, Zr, V, Nb, Ta, Cr, Ru, Rh, Pd and Pt are added helps improve the corrosion resistance, as compared with a $Co_{80}Cr_{12}Ta_4$ single film magnetic layer.

In particular, addition of Zr and Nb as chief elements substantially improves corrosion resistance without deteriorating the saturation magnetic flux density. This effect is substantially the same when the added content of Zr and Nb exceeds 0.1 atomic %. The same results were obtained despite the introduction of constant-temperature constant-humidity testing in which the samples were left to stand in an environment of 80° C., 80% RH (relative humidity).

Embodiment Five

In another embodiment of the present invention detailed in FIG. 1, similarly satisfactory corrosion resistance was exhibited when Ti, Pt, Ru, Ta, Rh, V, Nb, Cr and Pd were introduced. In such instances, the $Co_{80}Cr_{12}Ta_4$ lower magnetic recording layer 14 was formed maintaining a thickness (t) of 40 nm. Upon said lower magnetic recording layer 14 was formed either a $(Co_{75}Ni_{25})_{90}Zr_{10}$ or $(Co_{60}Ni_{40})_{94}Zr_6$ uppermost magnetic film 16 of a 10 nm thickness (t) to which were added Ti in concentrations of 1, 2 and 5 atomic %, Pt in concentrations of 0.2, 0.5, and 1.0 atomic %, Ru in concentrations of 0.5 and 1.0 atomic %, Ta in concentrations of 1, 2 and 5 atomic Rh in concentrations of 0.2, 0.5 and 1.0 atomic %, V in concentrations of 2, 4 and 6 atomic %, Nb in concentrations of 2, 4 and 6 atomic %, Cr in concentrations of 1, 2 and 5 atomic %, and Pd in concentrations of 0.2, 0.5 and 1.0 atomic %. The samples were left to stand in an environment of 60° C., 90% RH and class 10000 (wherein the number of dust particles of greater than 0.5 MICROm is 10000 per cubic foot) to examine their corrosion resistances. Upon the addition of these fourth elements (relative to the CoNiZr component of the uppermost magnetic layer 16), a very satisfactory reduction in magnetization of less than 5% in these magnetic films was found after a lapse of time of two weeks. These excellent results are attributed to the fact that addition of the fourth elements strengthens the structure of the oxidized surface film and substantially improves resistance against uniform corrosion and oxidation.

Such excellent results are realized when the content added to the above elements is greater than 0.01 atomic %. However, undesirable results occur relative to the saturation magnetization when the content added exceeds 15 atomic %.

Embodiment Six

In another embodiment of the present invention denoted in FIG. 1, a plated substrate is comprised of a non-magnetic 11.5 wt % P—Ni layer 12 plated maintaining a thickness (t) of 20 MICROm onto a 1.8 mm-thick Al alloy substrate 11 having an outer diameter of 130 mm, wherein additionally the surface was polished. Fine scars of a center-axis average coarseness Ra of 9 nm were formed in the surface of the substrate 11 in the circumferential direction thereby to form a non-magnetic plated layer 12 having a thickness (t) of 15 MICROm. A Cr layer 13 was then formed thereon maintaining a thickness (t) of 100 nm at conditions of substrate temperature of 250° C., Ar pressure of 4 mTorr, and DC electrical power of 3 W/cm$^2$.

Upon said Cr layer 13 was then formed a CoCr$_{14}$Pt$_{10}$ lower magnetic recording layer 14 maintaining a thickness (t) of 40 nm under the same conditions. A 10 nm-thick (Co$_{100-x}$Ni$_x$)$_{94}$Zr$_6$ uppermost magnetic recording layer (x=10, 20, 30, 40, 50) 16 was then formed thereon. The samples were left to stand in 0.1 ppm So$_2$, 0.1 ppm H$_2$S and 0.1 ppm Cl$_2$ in order to determine their corrosion strengths against gases. The use of an optical microscope revealed a smaller change in the surface shape than that of a Co$_{76}$Cr$_{14}$Pt$_{10}$ single film magnetic layer, a very small change in the surface resistance and good corrosion resistance against gases.

A non-magnetic covering layer 17 of SiO$_2$ was then formed maintaining a thickness (t) of 25 nm on the above structure. Finally, the magnetic recording medium was completed with the formation of a liquid lubricating layer 18 of perfluoroalkylpolyether maintaining a thickness (t) of 5 nm.

Figure 7:
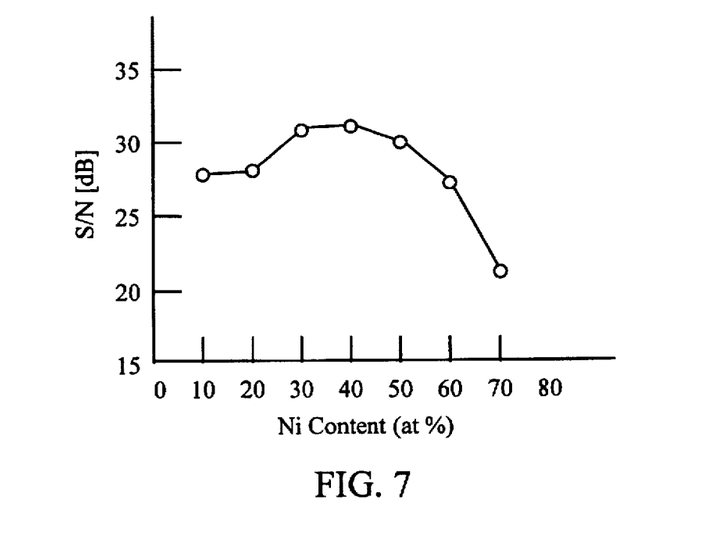
FIG. 7 is a characteristic graph for explaining the relationship between the S/N ratio of the magnetic recording medium and the Ni content in the uppermost magnetic recording layer according to the embodiment of FIG. 1.

The recording/reproducing characteristics were additionally evaluated using a thin-film magnetic head having a gap length of 0.4 MICROm. FIG. 7 shows that such characteristics were very favorable. When the Ni content was between the range of 30 atomic % and 50 atomic % with respect to Co, the S/N ratio was particularly desirable. S/N is represented by the following equation:

$$S/N(dB)=20 \log [(\text{high-frequency output})/(2 \, SQRT(2) \, (\text{disk noise}))] \quad (1)$$

Embodiment Seven

In another embodiment of the present invention as denoted in FIG. 1, said embodiment has preferred suitability to the vertical type of magnetization having magnetic recording layers 14, 16 which when combined are thicker than the previously-mentioned magnetic recording media of the present invention. Within such vertical magnetization structure, a plated substrate comprises a 10 nm-thick C film 12 formed under the conditions of 5 mTorr, 4 W/cm$^2$ and a substrate temperature of 100° C. on the Al alloy substrate 11. Upon said C film 12, an Ni—W—P layer 13 was formed maintaining a thickness t of 25 MICROm.

A Co$_{78}$Cr$_{14}$Pt$_8$ lower magnetic recording layer 14 was formed directly upon said Ni—W—P layer 13 maintaining a thickness (t) of 150 nm. Upon said lower magnetic recording layer 14, a (Co$_{65}$Ni$_{35}$)$_{93}$Zr$_7$ uppermost magnetic recording layer 16 was formed maintaining a thickness (t) of 50 nm, thereby combining to comprise a medium having excellent corrosion resistance and vertical magnetic recording properties. In this case, the lower magnetic recording layer 14 may be provided after the underlying layer 13 is formed on the substrate 11, 12 rather than directly on the substrate 11, 12. Comparably desirable results are realized even when the underlying layer 13 comprises Si formed to maintain a thickness (t) of 20 nm or Ge formed to maintain a thickness (t) of 50 nm. The impact of the underlying layer in improving corrosion resistance and vertical magnetic recording properties is recognized when the underlying layer 13 has a thickness (t) of greater than 20 nm.

Embodiment Eight

In another embodiment of the present invention as denoted in FIG. 1, a plated substrate comprises a non-magnetic 11.5 wt % P—Ni layer 12 plated maintaining a thickness (t) of 20 MICROm on a 1.8 mm-thick Al alloy substrate 11 having an outer diameter of 130 mm, wherein the surface was polished. Fine scars of a center-axis average coarseness Ra of 9 nm were formed in the surface of the substrate 11 in the circumferential direction thereby to form a non-magnetic plated layer 12 having a thickness (t) of 15 MICROm.

A Cr layer 13 was then formed upon said non-magnetic plated layer 12 maintaining a thickness (t) of 100 nm at conditions of substrate temperature 250° C., Ar pressure of 4 mTorr, and DC electric power of 3 W/cm$^2$. Upon said Cr layer 13 was then formed a (Co$_{100-x}$Cr$_x$)$_{94}$Pt$_{10}$ lower magnetic recording layer (x=10, 20, 30, 40, 50) 14 maintaining a thickness (t) of 40 nm under the same conditions as the Cr layer 13. Additionally, a (Co$_{70}$Ni$_{30}$)$_{94}$Zr$_6$ magnetic recording layer 16 was formed thereon maintaining a thickness (t) of 10 nm.

Embodiment Nine

In another embodiment of the present invention as denoted in FIG. 1, uppermost and lower magnetic recording layers 14, 16 of a (Co$_{70}$Ni$_{30}$)$_{94}$Zr$_6$ alloy were formed for the purpose of comparison under the conditions of substrate temperature 250° C., Ar pressure 4 mTorr and DC electric power of 3 W/cm$^2$. A non-magnetic covering layer 17 of SiO$_2$ was then formed maintaining a thickness (t) of 25 nm on the above structure. Finally, the magnetic recording medium was completed with the formation of a liquid lubricating layer 18 of perfluoroalkylpolyether maintaining a thickness (t) of 5 nm.

Figure 8:
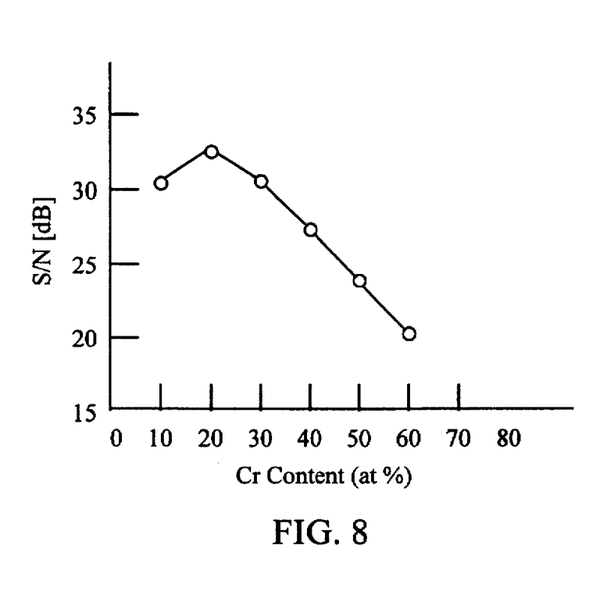
FIG. 8 is a characteristic graph for explaining the relationship between the S/N ratio of the magnetic recording medium and the Cr content in the uppermost magnetic recording layer according to the embodiment of FIG. 1.

The recording/reproducing characteristics were evaluated using a thin-film magnetic head having a gap length of 0.4 MICROm. Desirable results were realized relative to S/N ratio and very favorable recording/reproducing characteristics were found as shown in FIG. 8. In this case, the Cr content with respect to Co was between the range of than 10 atomic % and 30 atomic % (more specifically, between the range of 15 atomic % and 25 atomic %). Such desirable results were found not only when Pt was added but also when Ti, V, Zr, Nb, Mo, Hf, Ta, W and Ir were added. In the foregoing was described the method of forming a film of the CoCr type as the lower magnetic recording layer 14. The desirable results were also found when magnetic film based upon Co but lacking Cr was formed under the same conditions as the CoCr-type film to which were added at least one or more elements selected from the group consisting of such transition metals as Ti, V, Zr, Nb, Mo, Hf, Ta, W, Ir and Pt and from P and Si. The total content added to said Co-based film was less than 45 atomic %. In such case said added content was preferably between 5 atomic % and 40 atomic % (more preferably between 10 atomic % and 35 atomic %).

Embodiment Ten

Figure 9:
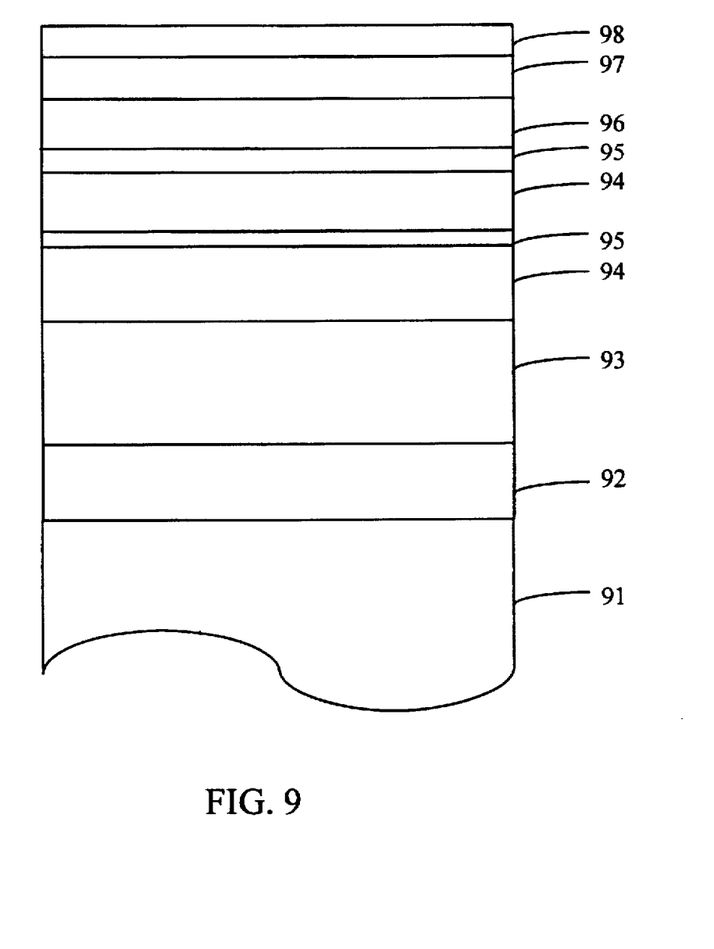
FIG. 9 is an illustrative view for explaining the sectional structure of a magnetic recording medium according to still another embodiment of the present invention.

FIG. 9 illustrates a still another embodiment of the present invention wherein reference numeral 91 denotes an Al alloy substrate, 92 denotes an Ni—P plated layer, 93 denotes a Cr underlying layer, 94 denotes a CoCr-type magnetic film, 95 denotes a Cr insertion film, 96 denotes a CoNi-type corrosion-resistant uppermost magnetic recording layer, 97 denotes a non-magnetic covering film, and 98 denotes a lubricating film. A non-magnetic 11.5 wt % P—Ni layer 92 was plated maintaining a thickness (t) of 20 MICROm on a 1.8 mm-thick Al alloy substrate 91 having an outer diameter of 130 mm, and the surface was polished.

Fine scars of a center axis average coarseness RA of 10 nm were formed in the surface of the substrate 91 in the circumferential direction thereby to form a non-magnetic plated layer 92 having a thickness (t) of 13 MICROm. A Cr underlying layer 93 was then formed thereon maintaining a thickness (t) of 200 nm at conditions of substrate temperature 220° C., Ar pressure of 5 mTorr, and DC electric power of 1 W/cm². Upon said Cr underlying layer 93 was then formed a $CoCr_{14}Ni_{14}$ lower magnetic recording layer 94 maintaining a thickness (t) of 10 nm. A Cr insertion film 95 was then formed upon said lower magnetic recording layer 94 maintaining a thickness (t) of 5 nm. A $(Co_{70}Ni_{30})_{94}Zr_6$ uppermost magnetic recording layer 96 was then formed thereon maintaining a thickness (t) of 10 nm. On the disk were further formed a non-magnetic covering layer 97 comprising $SiO_2$ maintaining a thickness (t) of 20 nm. Finally, the magnetic recording medium was completed with the formation of a liquid lubricating layer 98 of perfluoroalkylpolyether maintaining a thickness (t) of 5 nm.

Figure 10:
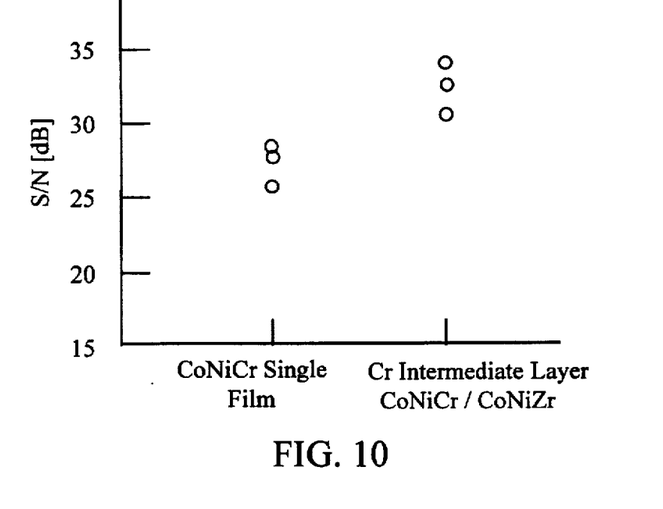
FIG. 10 is a characteristic graph for comparing the S/N ratio of the magnetic recording medium according to the embodiment of FIG. 9 under various conditions involving the interposed layer, additionally comparing the S/N ratio under various conditions involving single magnetic layer film media.

The recording/reproducing characteristics of the above embodiment of the magnetic recording medium of the present invention were evaluated using a thin-film magnetic head having a gap length of 0.4 MICROm. As shown in FIG. 10, said embodiment demonstrated very desirable recording/reproducing characteristics and S/N ratio, particularly as compared with the case of a $CoCr_{14}Ni_{10}$ single film magnetic layer (a comparative example having a thickness t equal to the total thickness t of the magnetic recording layer of the embodiment of FIG. 9). Said medium further exhibited favorable corrosion strength similar to the aforementioned embodiment of FIG. 9 in the test of spraying a 5N NaCl solution and in the corrosion test using 1 ppm $Cl_2$ gas.

While the corrosion resistance of the instant embodiment decreases drastically when the thickness t of the $CoCr_{14}Ni_{14}$ single film magnetic layer is small, the corrosion strength markedly improves by forming $(Co_{70}Ni_{30})_{94}Zr_6$ on the uppermost magnetic recording layer 96. The Cr insertion film 95 should have a thickness (t) of smaller than 10 nm from the standpoint of magnetic recording. The insertion film 95 was notably effective not only when it was comprised of a non-magnetic metal but also when it was comprised of an oxide or a nitride.

Embodiment Eleven

In still yet another embodiment of the present invention denoted in FIG. 1, magnetic layers 14, 16 were formed in an Ar gas containing $O_2$, wherein the oxygen content in the magnetic layers 14, 16 was set to be 0.1 to 10 atomic % in order to form a magnetic recording medium. A non-magnetic 11.5 wt % P—Ni layer 12 was plated with a maintained thickness of 20 MICROm onto a 1.8 mm-thick Al alloy substrate 11 having an outer diameter of 130 mm, wherein additionally the surface was polished. Fine scars of a center-axis average coarseness Ra of 9 nm were formed in the surface of the substrate 11 in the circumferential direction thereby to form a non-magnetic plated layer 12 having a thickness of 15 MICROm.

A Cr layer 13 was then formed maintaining a thickness of 250 nm at conditions of substrate temperature 200° C., Ar pressure of 5 mTorr, and DC electric power of 5 W/cm². Upon said Cr layer 13 was then formed a $CoCr_{10}Mo_5$ lower magnetic recording layer 14 maintaining a thickness of 30 nm. There was then formed thereon an uppermost magnetic recording layer 16 of either $(Co_{100-x}Ni_x)_{94}Zr_6$ (x=30, 40), $(Co_{60}Ni_{40})_{93}Nb_7$ or $(Co_{60}Ni_{40})_{92}Nb_5Mo_3$ that contained oxygen in concentrations of 0.1, 0.5, 1.0, 3.0, 5.0, and 10.0 atomic % while maintaining a thickness of 10 nm under conditions of Ar pressure of 2 mTorr and DC electric power of 2 W/cm².

Upon the above combined structure were further formed a non-magnetic covering layer 17 comprised of diamond-like carbon maintaining a thickness of 25 nm. Finally, the magnetic recording media of the present invention was completed by the addition of a liquid lubricating layer 18 comprised of perfluoroalkylpolyether maintaining a thickness of 5 nm.

Figure 11:
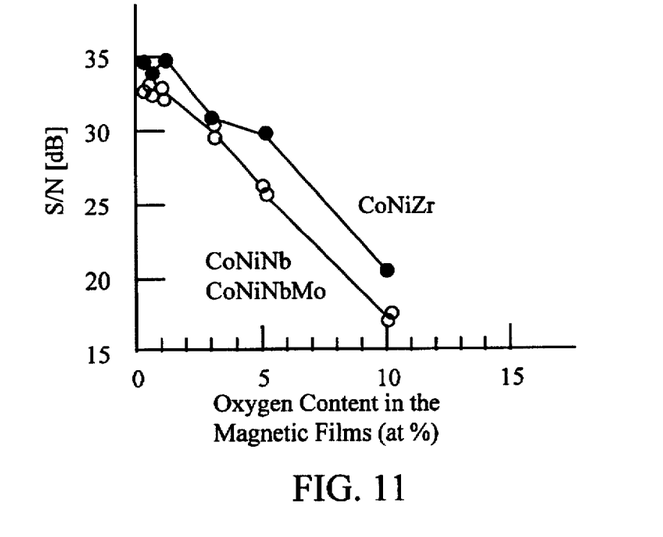
FIG. 11 is a characteristic graph for explaining the relationship between the S/N ratio of the magnetic recording medium and the oxygen content in the magnetic layer under alternative compositions of the uppermost magnetic recording layer according to the embodiment of FIG. 1.

The recording/reproducing characteristics were evaluated using a thin-film magnetic head having a gap length of 0.4 MICROm. As shown in FIG. 11, both the output and the disk noise decrease proportionally as the content of oxygen increases. As a result, the S/N ratio increases with an increase in the content of oxygen. When the content of oxygen exceeds 5 atomic %, the output decreases drastically and the S/N decreases. This relationship is attributed to the fact that if oxygen is contained in large concentrations in the uppermost magnetic recording layer 16, said uppermost magnetic recording layer 16 loses its function of medium noise reduction due to the decrease in saturation magnetic flux.

Consequently, a particularly preferred content of oxygen is within the range between 0.1 atomic % and 3 atomic %. The magnetic recording media that were left to stand in an environment of 80° C., 80%RH and class 10000 exhibited better corrosion resistance than the magnetic recording media having the $CoCr_{10}Mo_5$ single magnetic recording layer.

Embodiment Twelve

Figure 12:
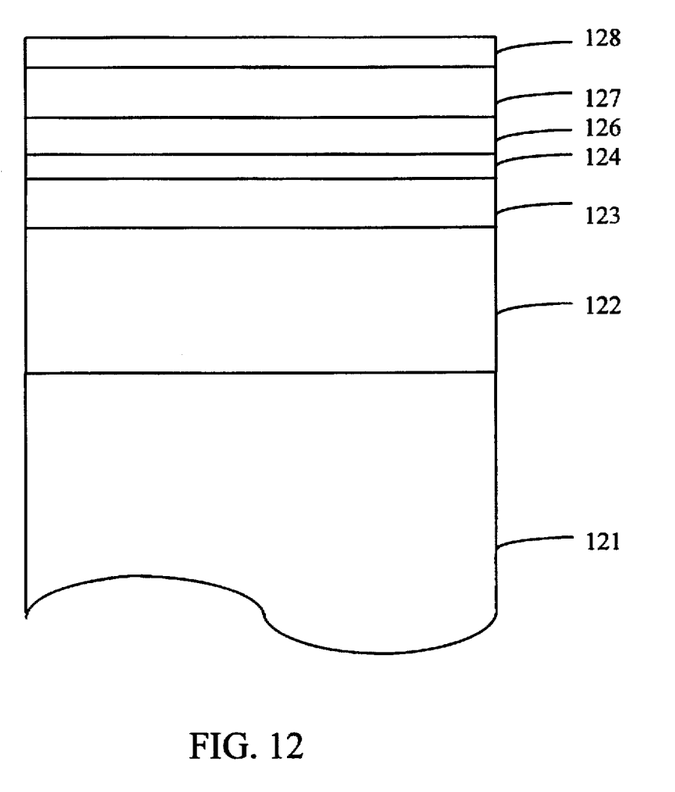
FIG. 12 is an illustrative view for explaining the sectional structure of a magnetic recording medium according to yet another embodiment of the present invention.

FIG. 12 illustrates a still further embodiment wherein reference numeral 121 denotes a glass substrate or an organic substrate such as of polyimide or PET having fine protuberances, 122 denotes a Cr underlying layer, 123 denotes a CoCr-type magnetic layer, 124 denotes a non-magnetic film such as of Cr, 126 denotes a corrosion resistant magnetic recording layer such as of CoNiZr or CoNiNb, 127 denotes a non-magnetic covering layer comparable to that described previously, and 128 denotes a lubricating layer. The compositions, film thicknesses and method of forming films are substantially identical to those described in the other embodiments of the present invention.

Even with changes to the substrate as described in the above embodiment 12, it is possible to provide a magnetic disk having comparably improved recording/reproducing characteristics by contriving the magnetic layers 123, 126 in a manner which enhances the corrosion resistance.

The foregoing embodiments of the present invention described the case wherein the underlying layer 13, 93, 122 was comprised of Cr. High recording density media having large corrosion strengths can also be obtained with non-magnetic metal layers 13, 93, 122 such as Cr alloy, W and Mo which control the orientation of magnetic layers 14, 16, 94, 96, 123, 126.

The present invention as denoted by the above embodiments is in no way limited to magnetic disks. Rather, said invention can be adapted to any application which requires characteristics of recording/reproduction, including but not limited to hard disks for computers, floppy disks, or magnetic tapes. Such application may additionally comprise any recording/reproducing device (such as a disk drive or the like) which implements such recording/reproducing functions using magnetic recording. Furthermore, application of the present invention further comprises any command-driven system such as a computer or the like which governs the operation of said recording/reproducing device relative to said magnetic recording medium.

Moreover, the method of forming films is not limited to the sputtering method but may be adapted to any technique of layering formation including the vaporization method, ion beam sputtering method, or any like method to deposit these substances on a substrate.

The thicknesses (t) of the magnetic recording layers 14, 16, 94, 96, 123, 126 of the foregoing embodiments were studied extensively. In the case of the intersurface magnetization recording, the thickness of the uppermost magnetic recording layer 16, 96, 126 should in practice range from 5 nm to 100 nm. When the thickness (t) is less than 5 nm, it becomes difficult to obtain the desirable thickness and advantages of the present invention in the magnetic recording medium. In the case of the vertical magnetization recording, the thickness (t) should in practice range from roughly 200 nm to 300 nm. The thickness (t) of the lower magnetic recording layer 14, 94, 123 should be greater than the thickness of the uppermost magnetization layer 16, 96, 126.

The alloy layers of the present invention were formed while variously changing the pressure of argon gas in order to control the particle diameter of columnar crystals as described above. During such changing efforts, it was learned that the particle diameter can be easily controlled when the uppermost magnetic recording layer 16, 96, 126 is formed under a gas pressure which is lower than the gas pressure under which the lower magnetic films 14, 94, 123 are formed. When such pressure requirements are maintained, the particle diameter of the columnar crystals in the uppermost magnetic recording layer 16, 96, 126 does not become greater than the particle diameter of crystals of the lower magnetic recording layers 14, 94, 123.

Additionally, the alloy layers of the present invention were formed while variously changing the electric power at the time of sputtering in order to control the particle diameter of columnar crystals as described above. During such changing efforts, it was learned that the particle diameter can be easily controlled when the uppermost magnetic recording layer 16, 96, 126 is formed with a greater electric power than the electric power with which the lower magnetic recording layers 14, 94, 123 are formed. When such electric power requirements are maintained, the particle diameter of the columnar crystals in the uppermost magnetic recording layer 16, 96, 126 does not become greater than the particle diameter of crystals of the lower magnetic recording layers 14, 94, 123.

The particle diameter of the uppermost magnetic recording layer 16, 96, 126 should be as small as possible. In practice, however, the diameter in said uppermost magnetic recording layer 16, 96, 126 should range from 10 nm to 80 nm, more preferably from about 10 nm to about 50 nm. Both the aforementioned advantages of the present invention and practicability are lost if the diameter becomes smaller than 10 nm. Additionally, the thickness (t) of the lower magnetic recording layer 14, 94, 123 should be greater than that of the uppermost magnetic recording layer 16, 96, 126.

The magnetic recording media of the above embodiments of the present invention and the magnetic disks used for comparison were mounted on a magnetic recording/reproducing device to investigate increase of error in a corrosive gas environment.

An increase in the error was observed in the case of the magnetic disk for comparison, but no increase in the error was observed in the case of the magnetic recording media described in the specification of this application.

The foregoing represents what the inventors consider the detailed description of the best mode of practicing their invention. The spirit of the invention, however, is not limited to the specific embodiments set forth above.

What is claimed is:

1. A magnetic recording medium comprising:
   a non-magnetic plated substrate;
   a non-magnetic underlying layer disposed on said substrate; and
   a magnetic recording layer having a columnar crystal structure wherein said magnetic recording layer is disposed on said underlying layer, said magnetic recording layer comprising a plurality of magnetic alloy layers for magnetic recording, said plurality of magnetic alloy layers being comprised of:
   an uppermost magnetic recording layer; and
   at least one lower magnetic recording layer, wherein the average particle diameter of columnar crystals in a surface of said uppermost magnetic recording layer of said magnetic recording layer is smaller than in a surface of said lower magnetic recording layer; and a protective layer disposed on said magnetic recording layer.

2. A magnetic recording medium as claimed in claim 1, wherein said lower magnetic recording layer further comprises a CoCr-based alloy for magnetic recording, said CoCr-based alloy consisting of:
   1 to 30 atomic % Cr;
   1 to 20 atomic % at least one kind selected from a group consisting of Ti, V, Zr, Nb, Mo, Hf, Ta, W, Ir and Pt, said group also including Ge and Si; and
   the balance Co and incidental impurities.

3. A magnetic recording medium as claimed in claim 1, wherein said lower magnetic recording layer additionally comprising a Co-based alloy for magnetic recording, said Co-based alloy consisting of:
   1 to 45 atomic % at least one kind selected from a group consisting of Ti, V, Zr, Nb, Mo, Hf, Ta, W, Ir, Pt, said group also including P and Si; and
   the balance Co and incidental impurities.

4. A magnetic recording medium as claimed in claim 1, further comprising at least one non-magnetic intermediate layer wherein each said intermediate non-magnetic layer is singularly interposed between said alloy layers.

5. A magnetic recording medium as claimed in claim 4, said magnetic recording layer additionally comprising an oxygen content of less than 10 atomic %, and said uppermost magnetic recording layer containing an oxygen content greater than the oxygen content in the magnetic recording layer excluding said uppermost layers.

6. A magnetic recording medium as claimed in claim 5, wherein the non-magnetic intermediate layer is comprised of Cr.

7. A magnetic recording medium as claimed in claim 1, wherein said uppermost layer is comprised of a CoNi-based alloy for magnetic recording, said CoNi-based alloy consisting of:
   1 to 40 atomic % Ni;
   1 to 20 atomic % at least one kind selected from the group consisting of Ti, V, Cr, Zr, Nb, Mo, Hf, Ta, W, Ir and Pt; and
   the balance Co and incidental impurities.

8. A magnetic recording medium as claimed in claim 7, said magnetic recording layer additionally comprising an oxygen content of less than 10 atomic %, and said uppermost magnetic recording layer containing an oxygen content greater than the oxygen content in the magnetic recording layer excluding said uppermost layers.

9. A magnetic recording medium as claimed in claim 7, further comprising at least one non-magnetic intermediate layer wherein each said intermediate non-magnetic layer is singularly interposed between said alloy layers.

10. A magnetic recording medium as claimed in claim 9, wherein the non-magnetic intermediate layer is comprised of Cr.

11. A magnetic recording medium as claimed in claim 1, wherein the plated substrate consists of a non-magnetic substrate onto which a layer of Cr is formed.

12. A magnetic recording medium as claimed in claim 11, wherein said underlying layer consists of a Ni—W—P alloy, an alloy comprising Si, or an alloy comprising Ge.

13. A magnetic recording medium as claimed in claim 11, wherein said substrate is plated and consists of a non-magnetic substrate onto which a layer of Cr is formed.

14. The magnetic recording medium of claim 1, wherein the uppermost magnetic recording layer of said alloy layers is thinner than the magnetic recording layer excluding said uppermost magnetic recording layer.

* * * * *